United States Patent
Gailloux et al.

(10) Patent No.: US 8,249,552 B1
(45) Date of Patent: Aug. 21, 2012

(54) PRE AND POST-PAID SERVICE PLAN MANAGER

(75) Inventors: Michael A. Gailloux, Overland Park, KS (US); Kenneth Samson, Belton, MO (US); Gautam M. Shah, Lake Forest, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 592 days.

(21) Appl. No.: 12/397,993

(22) Filed: Mar. 4, 2009

(51) Int. Cl.
*H04M 15/00* (2006.01)

(52) U.S. Cl. ........ 455/406; 455/405; 455/408; 455/419; 379/114.01

(58) Field of Classification Search .............. 455/406, 455/405, 408, 419
See application file for complete search history.

(56) References Cited

U.S. PATENT DOCUMENTS

| | | | | |
|---|---|---|---|---|
| 7,600,674 B1 * | 10/2009 | Marah et al. | | 235/380 |
| 8,068,825 B2 * | 11/2011 | Mikan et al. | | 455/419 |
| 2003/0026404 A1 * | 2/2003 | Joyce et al. | | 379/144.01 |
| 2003/0220093 A1 * | 11/2003 | Fellenstein et al. | | 455/405 |
| 2004/0137874 A1 * | 7/2004 | Veerepalli et al. | | 455/405 |
| 2004/0185827 A1 * | 9/2004 | Parks | | 455/406 |
| 2008/0146211 A1 * | 6/2008 | Mikan et al. | | 455/419 |
| 2009/0005000 A1 * | 1/2009 | Baker et al. | | 455/405 |
| 2009/0047926 A1 * | 2/2009 | Mastrantuono et al. | | 455/405 |
| 2009/0061818 A1 * | 3/2009 | Myers et al. | | 455/408 |
| 2009/0099965 A1 * | 4/2009 | Grant, IV | | 705/41 |
| 2009/0281947 A1 * | 11/2009 | Erel | | 705/44 |
| 2009/0318112 A1 * | 12/2009 | Vasten | | 455/406 |

* cited by examiner

*Primary Examiner* — Jinsong Hu
*Assistant Examiner* — Jean Chang (57) ABSTRACT

A service plan manager is provided, including a manager engine and a storage device to store data for a service account that comprises a pre-paid service plan associated with a first communication device and a post-paid service plan associated with a second communication device. The manager engine determines whether a balance associated with the pre-paid service plan is below a threshold, and communicates a request for increasing the balance to a device associated with the service account if the balance associated with the pre-paid service plan is below the threshold. The manager engine discontinues service for the first communication device until an approval of the request for increasing the balance is received, increases the balance in response to a receipt of the approval of the request for increasing the balance, and adds an amount associated with increasing the balance to an invoice associated with the service account.

13 Claims, 4 Drawing Sheets

PRE AND POST-PAID SERVICE PLAN MANAGER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A communication device may be a mobile phone, a wireless handset, a pager, a personal digital assistant, a gaming device, a media player, a digital camera, a digital calculator, a portable computer, a tablet computer, or a laptop computer. Many mobile phones, and other types of communication devices, have become so inexpensive to purchase and use that customers may purchase a prepaid mobile phone at a convenience store, activate the phone, use the phone, and then decide whether to discard the phone or to add more communication time when the prepaid service plan's usage limit is reached. However, customers, such as children and teenagers, may run low on communication time and not have the money or the capability to add additional time to their prepaid mobile phone on occasions when they need to communicate with their parents. Furthermore, a child or teenager may use their prepaid mobile phone in ways that their parents do not approve.

SUMMARY OF THE INVENTION

In some embodiments, a service plan manager is provided. The service plan manager includes a processor, a manager engine, and a storage device to store data for a service account that comprises a pre-paid service plan associated with a first communication device and a post-paid service plan associated with a second communication device. The manager engine, when executed by the processor, determines whether a balance associated with the pre-paid service plan is below a threshold, and communicates a request for increasing the balance to a device associated with the service account in response to a determination that the balance associated with the pre-paid service plan is below the threshold. The manager engine discontinues service for the first communication device until an approval of the request for increasing the balance is received, increases the balance in response to a receipt of the approval of the request for increasing the balance, and adds an amount associated with increasing the balance to an invoice associated with the service account.

In some embodiments, a computer implemented method is provided for a service plan manager. Data is stored for a service account that comprises a pre-paid service plan associated with a first communication device and a post-paid service plan associated with a second communication device. Whether a balance associated with the pre-paid service plan is below a threshold is determined. A request for increasing the balance is communicated to a device associated with the service account in response to a determination that the balance associated with the pre-paid service plan is below the threshold. Service for the first communication device is discontinued until an approval of the request for increasing the balance is received. The balance is increased in response to a receipt of the approval of the request for increasing the balance. An amount associated with increasing the balance is added to an invoice associated with the service account.

In some embodiments, a service plan manager is provided. The service plan manager includes a processor, a manager engine, and a storage device to store data for a service account that comprises a pre-paid service plan associated with a first communication device and a post-paid service plan associated with a second communication device. The manager engine, when executed by the processor, determines whether the service account is at a beginning of a new billing cycle, and determines an amount that a balance associated with the pre-paid service plan is below a threshold in response to a determination that the service account is at the beginning of the new billing cycle. The manager engine also increases the balance by the amount and adds the amount to an invoice associated with the service account.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

When a prospective communication service customer requests to subscribe to a post-paid service plan, a communication service provider may decide to offer a subscription to the post-paid service plan only if the prospective customer's credit rating indicates that the prospective customer is likely to pay a post-paid invoice. The communication service provider accepts a risk of a customer not paying a post-paid account. In contrast to a pre-paid service plan in which a customer pays for services before using the services, in a post-paid service plan the customer pays for the services after using the services. The communication service provider may track a communication device's service plan charges over a period of time, such as a month, and then submit a post-paid invoice for the charges to the communication device user.

Some communication device users may purchase a new communication device and add a service plan for the new communication device to their own service account that includes their own service plan. For example, parents purchase a new phone for their child and add the child's service plan to their own service account that includes their own service plans. Some children may use their mobile phone in a manner that is not approved by their parents, such as sending 1,000 text messages in a month or significantly exceeding the number of communication minutes allocated for the child's phone each month. Some surprised and angry parents may react to subsequently receiving an invoice with an unanticipated charge by canceling their child's service plan, refusing to pay their invoice, or even by canceling their own service account. Each of these reactions is bad for the business of the communication service provider.

The present disclosure provides a service plan manager that includes a manager engine and a storage device. The storage device stores data for a service account, such as post-paid service plan associated with a parent's mobile phone and a pre-paid service plan associated with a child's mobile phone. Although the service plan manager may manage family plans, the service plan manager may also manage business plans, such as when a sales department offers pre-paid phones for use to its salesmen. Therefore, a parent's service account may be a hybrid combination of service plans in which the parent pays for their own services after using the post-paid services, but pays for their child's service before their child uses their pre-paid services. The manager engine monitors the balance for child's service plan to determine when the balance of the child's pre-paid service plan drops below a threshold, such as dropping to zero dollars or zero minutes of communication time. When the child's service plan drops below the threshold, the manager engine communicates a request for increasing the balance to a device associated with the service account, such as the parent's mobile phone or the parent's personal computer. The manager engine discontinues service for the child's mobile phone until it receives an approval of the request for increasing the balance, thereby limiting the child's ability to increase the parent's financial responsibilities. The request may provide information about the child's phone communications.

Upon receipt of the request, the parent may know when the child has exhausted their allocated balance of funds for the month, review the child's phone communications, and decide whether or not to increase the balance for the child's phone. If the parent decides to increase the balance for the child's phone, the parent may approve the request via an input from the parent's phone or the parent's personal computer. If the parent decides not to approve the request for this month, the start of next month's billing cycle for the parent's service account may trigger an approval to increase the balance for the child's phone for the next month. Upon receipt of the approval, the manager component increases the balance for the child's service plan, reestablishes service for the child's mobile phone, and adds the balance increase to an invoice for the parent's service account.

The manager engine may provide benefits for service plan management even when the balance on the child's phone does not drop to a low threshold, such as zero dollars or zero minutes of communication time. If the manager engine determines that the date of the parent's service account is at a beginning of a new billing cycle, the manager engine may determine how much the balance for the child's service plan is below a maximum monthly threshold. For example, if the child's phone is allocated $30 each month and the balance is currently at $12, then the balance for the child's phone is $18 below the normal maximum monthly threshold. The manager engine may increase the balance to the threshold amount and add the balance increase to an invoice for the parent's service account. For example, if the balance for the child's phone is $12, the manager engine adds $18 to the balance for the child's phone and $18 to an invoice for the parent's service account. The manager engine may "top-off" the balance for the child's account each month, where the top-off amount is based on how much the child used the phone during the previous month. The manager engine enables parents to regularly increase the balance for their children's phones without the risk of their children running up an unanticipated and expensive phone bill. A child may also be able to use their own money to directly top up their own account, such that the manager engine sends a message to notify the child's parents of the child's balance increase. The manager engine also increases customer satisfaction for the communication service provider, whose customers are less likely to receive surprising and expensive invoices due to their children's communication activities, which may lead to less time spent by customer service representatives working with parents on expensive invoices and to reduced incidents of customers discontinuing their service.

Figure 1:
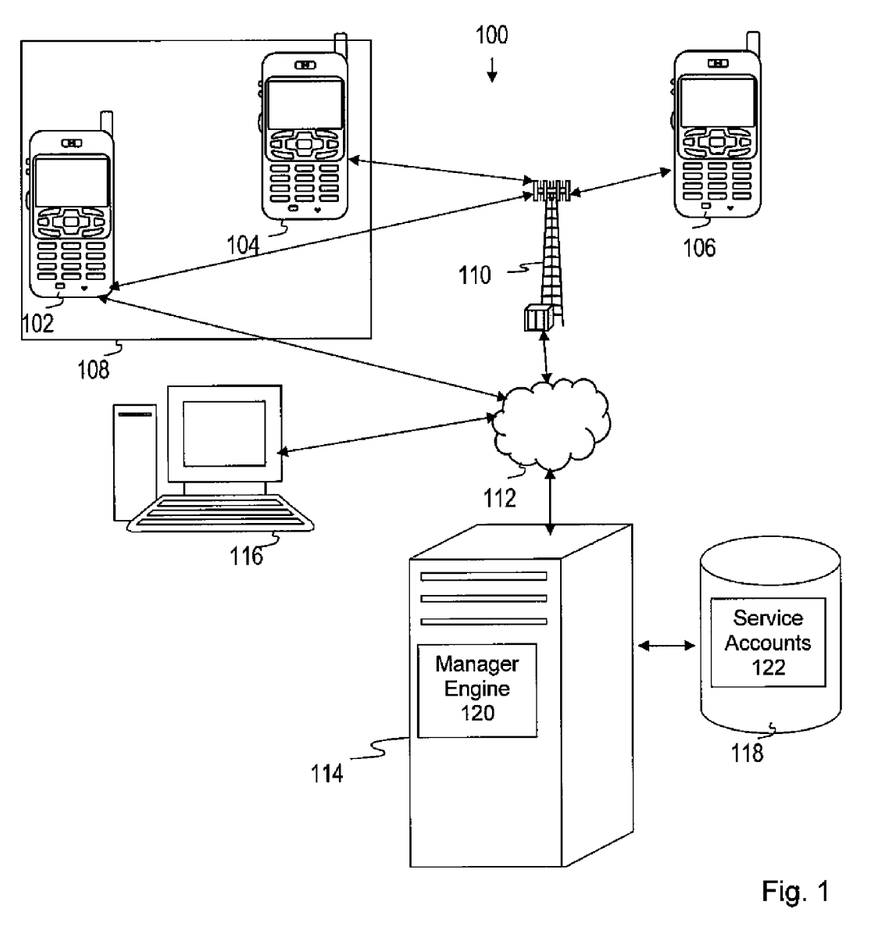
FIG. 1 illustrates a system for a service plan manager according to some embodiments of the present disclosure.

Turning now to FIG. 1, a diagram of a system 100 for a service plan manager is depicted according to embodiments of the present disclosure. The system 100 includes a first communication device 102, a second communication device 104, a third communication device 106, a group 108 of the communication devices 102-104, a base transceiver station 110, a communication network 112, a server 114, a user interface 116, and a data store 118. The communication devices 102-106 may communicate with the server 114 via the base transceiver station 110 and the communication network 112. The first communication device 102, which may be a land line telephone or a mobile telephone, may also communicate directly with the communication network 112. The group 108 of communication devices 102-104 may be associated with a service account, such as a family plan service account or a business plan service account. If the communications devices 102-104 are used by a parent and a child, respectively, the first communication device 102 may be referred to as the parent communication device 102 and the second communication device 104 may be referred to as the child communication device 104. If the communications devices 102-104 are used by a supervisor and an employee, respectively, the first communication device 102 may be referred to as the supervisor communication device 102 and the second communication device 104 may be referred to as the employee communication device 104.

The user interface 116 is associated with a communication device user, such as a parent that uses the parent communication device 102. The user interface 116 communicates with the server 114 via the communication network 112.

The server 114 includes a manager engine 120. The server 114 communicates with the data store 118, which includes service accounts 122. Although depicted separately, the server 114, the data store 118, and their functions may be combined together in any combination.

The manager engine 120 may determine whether the balance for the pre-paid service plan for the child communication device 104 is below a threshold, such as at zero dollars or zero communication minutes. If the balance is below the threshold, the manager engine 120 may communicate a request for increasing the balance to either the parent communication device 102 or the user interface 116 that may access the parent's service account.

The manager engine 120 may communicate the request as a text message, which may be quick and inexpensive to send to the parent communication device 102. The request may provide information about communications associated with the child communication device 104. For example, when the manager engine 120 sends the request for approval to the parent user interface 116, the request includes information about the calls made and the text messages sent by the child communication device 104, thereby enabling the parent to determine why the balance for the child communication device 104 is below the threshold.

Until the manager engine 120 receives approval of this request, the manager engine 120 discontinues service for the child communication device 104. In an embodiment, service restoration may not be automatic, and may require multiple events, such as multiple funding events. The request may be approved by the date changing to the beginning of a new billing cycle for the parent's service account or by the parent entering an approval via the parent communication device 102 or the user interface 116. This approval process gives the parent an active role in monitoring the child's phone usage.

The approval may specify the balance increase amount based on user input. For example, the parent may decide that although the child needs some funds to call home from school, the child has used the monthly allocation of funds too quickly. Therefore, rather than approving the request to increase the child's balance from $0 to $30, the parent instructs the manager engine 120 to increase the child's balance by $15 via input to the parent communication device 102. The manager engine 120 communicates the amount of the balance increase to the child communication device 104, which enables the child to learn about the amount of the balance increase specified by the parent. The parent may communicate via the parent communication device 102 and the child communication device 104 to explain the amount of the balance increase, such as sending an explanatory text message.

In response to an approval, the manager engine 120 may increase the balance, continue service for the child communication device 104, and add an amount associated with increasing the balance to an invoice associated with the parent's service account. Increasing the balance may add a specific number of minutes for user communication to the pre-paid plan. The amount added to the invoice may be greater than the amount of the balance increase. For example, after increasing the child's pre-paid service plan by $30, the manager engine may add $33 to the parent's service account, where the $33 includes the $30 balance increase and a $3 balance increase fee.

The manager engine 120 may enable the parent, or another user of the parent's service account, to add another post-paid plan or another pre-paid plan associated with the third communication device 106 to the parent's service account. For example, the parent uses the parent communication device 102 to request the manager engine 120 to add another post-paid plan for the third communication device 106, which may be referred to as the spouse communication device 106, to the parent's service account.

The manager engine 120 may also enable either the parent or the child to add an amount to the balance via a web browser, a customer care system, and/or an automated interactive voice message system. For example, the child purchases a card for additional communication time from a retail store that sells pre-paid mobile phones, calls a number listed on the card to identify the child communication device 104, and adds the communication time to the child communication device 104.

Additionally, the manager engine 120 may enable a user of the parent's service account to set the threshold and/or the balance increase amount. For example, the parent may decide that receiving a request for a balance increase when the child's balance reaches zero may mean that the child communication device 104 is out of service for too long while the manager engine 120 is waiting for approval from the parent communication device 102. Therefore, the parent sets the threshold that triggers the balance increase request to $5 so that the child communication device 104 still has some communication time while the manager engine 120 is waiting for the approval for the balance increase from the parent communication device 102.

If the parent's service account is at a beginning of a new billing cycle, the manager engine 120 may determine the amount that the balance of the child's pre-paid service plan is below a monthly maximum threshold. The manager engine 120 increases the balance by the determined amount, and adds the determined amount to an invoice associated with the parent's service account. For example, if the balance for the child's phone is $12 and the monthly maximum threshold is $30, the manager engine 120 adds $18 to the balance for the child's phone to increase the balance to $30 and adds $18 to an invoice for the parent's service account. In another example, the manager engine 120 may add an allowance of $10 each week to the balance for the child's phone provided that the balance does not exceed a parent-specified maximum. In another embodiment, the manager engine 120 may increment the balance for the phone by a fixed amount biweekly, semimonthly, or some other periodic interval. The parent may specify the threshold for the child's service plan via the parent's communication device 102. For example, if the child has used the child communication device 104 responsibly for months by never dropping the balance down to zero communication minutes, the parent may decide to reward the child by increasing the monthly maximum threshold from $30 a month to $35 a month. The manager engine 120 may discontinue service for the child communication device 104 based on a reported loss of the child communication device 104 so that the parent does not have to pay for monthly top-ups anymore.

Though illustrated as a mobile phone, the communication devices 102-108 may take various forms including a personal digital assistant (PDA), a media player, a mobile computer, a digital camera, a mobile telecommunication device, a telephone, a digital music player, a mobile handset, a handheld gaming device, a wireless mobile device, a pager, a portable computer, a tablet computer, a laptop computer, and a digital calculator. Suitable communication devices may combine some or all of these functions. The communication devices 102-108 may communicate by a radio access network providing access to the communication network 112. The server 114 is connected to the communication network 112. The communication devices 102-108 communicate with the server 114 via the radio access network and the communication network 112. Other communication paths may also be used.

Figure 4:
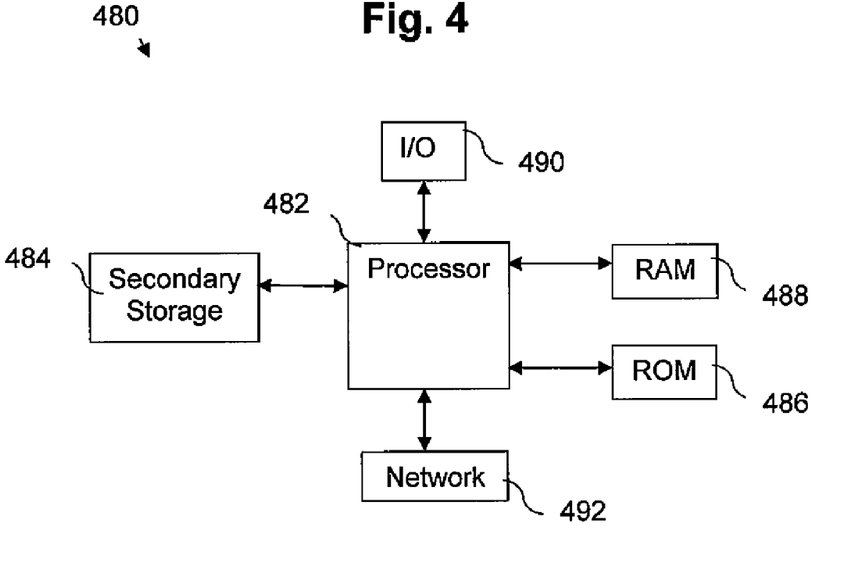
FIG. 4 illustrates an exemplary computer system suitable for implementing the several embodiments of the disclosure.

The server 114 may be implemented on a computer system, which is discussed below in reference to FIG. 4. The manager engine 120 may be implemented as a software program. The number and the types of communication devices, user interfaces, networks, servers, manager engines, data stores, and service plans in FIG. 1 are exemplary.

Figure 2:
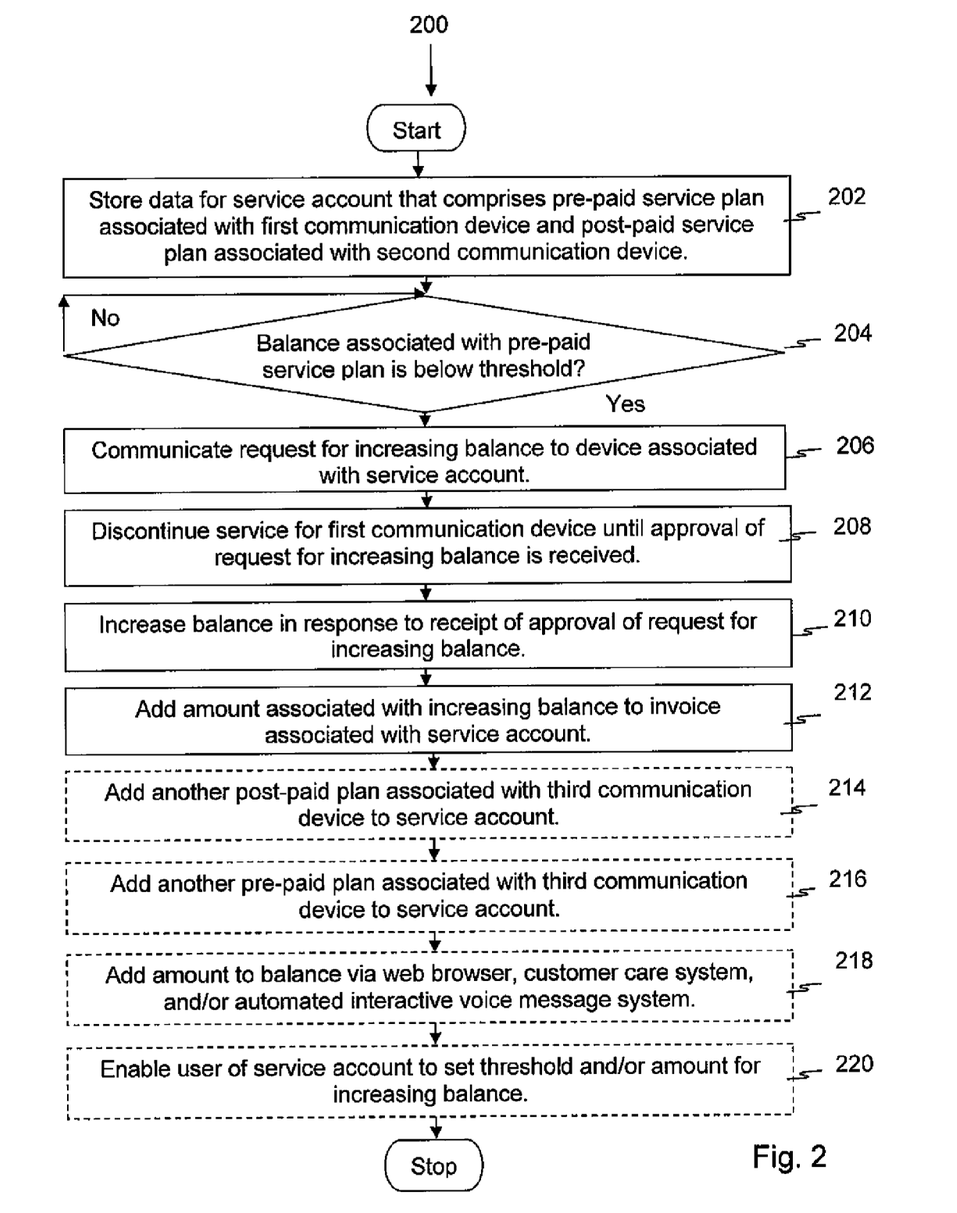
FIG. 2 is a flowchart of a method for a service plan manager according to some embodiments of the present disclosure.

FIG. 2 shows a flowchart of a method 200 for a service plan manager according to some embodiments of the present disclosure. The system 100 can execute the method 200 to enable a communication device to approve a requested balance increase for a pre-paid service plan when the balance of the pre-paid service plan drops below a threshold. The method 200 may be applied to either family plans or to business plans.

In box 202, data is stored for a service account that comprises a pre-paid service plan associated with a first communication device and a post-paid service plan associated with a second communication device. For example, the manager engine 120 stores data for a parent's service account that includes a pre-paid service plan associated with the child communication device 104 and a post-paid service plan associated with the parent communication device 102.

In box 204, whether a balance associated with the pre-paid service plan is below a threshold is determined. For example, the manager engine 120 determines whether the balance associated with the child's pre-paid service plan is zero dollars. If the manager engine 120 determines that the balance associated with the child's pre-paid service plan is not below the threshold, the method 200 returns to box 204 to continue checking the balance. If the manager engine 120 determines that the balance associated with the child's pre-paid service plan is below the threshold, the method 200 continues to box 206.

In box 206, a request for increasing the balance is communicated to a device associated with the service account. For example, the manager engine 120 communicates a request for increasing the balance to the parent communication device 102 or to the parent's user interface 116.

In box 208, service for the first communication device is discontinued until approval of the request for increasing the balance is received. For example, the manager engine 120 discontinues service for the child communication device 104 until approval of the request for increasing the balance is received.

In box 210, the balance is increased in response to receipt of an approval of the request for increasing the balance. For example, the manager engine 120 increases the balance from $0 to $30 in response to receipt of the approval.

In box 212, an amount associated with increasing the balance is added to an invoice associated with the service account. For example, the manager engine 120 adds $30 to an invoice associated with the parent's service account.

In box 214, another post-paid plan associated with a third communication device is optionally added to the service account. For example, the manager engine 120 adds another post-paid plan associated with the third communication 106 device, which is a spouse's phone, to the parent's service account.

In box 216, another pre-paid plan associated with a third communication device is optionally added to service account. For example, the manager engine 120 adds another pre-paid plan associated with the third communication device 106, which is another child's phone, to the parent's service account.

In box 218, an amount is optionally added to the balance via a web browser, a customer care system, and/or an automated interactive voice message system. For example, the manager engine 120 adds $15 to the balance when the child purchases $15 of communication time, inputs the additional time via an automated interactive voice message system, and sends a message to the child's parents about the child's balance increase and/or about the child's usage of the service.

In box 220, a user of the service account is optionally enabled to set the threshold and/or the amount for increasing the balance. For example, the manager engine 120 enables a user of the parent service account to set the threshold that triggers the request for a balance increase from $0 to $5.

Figure 3:
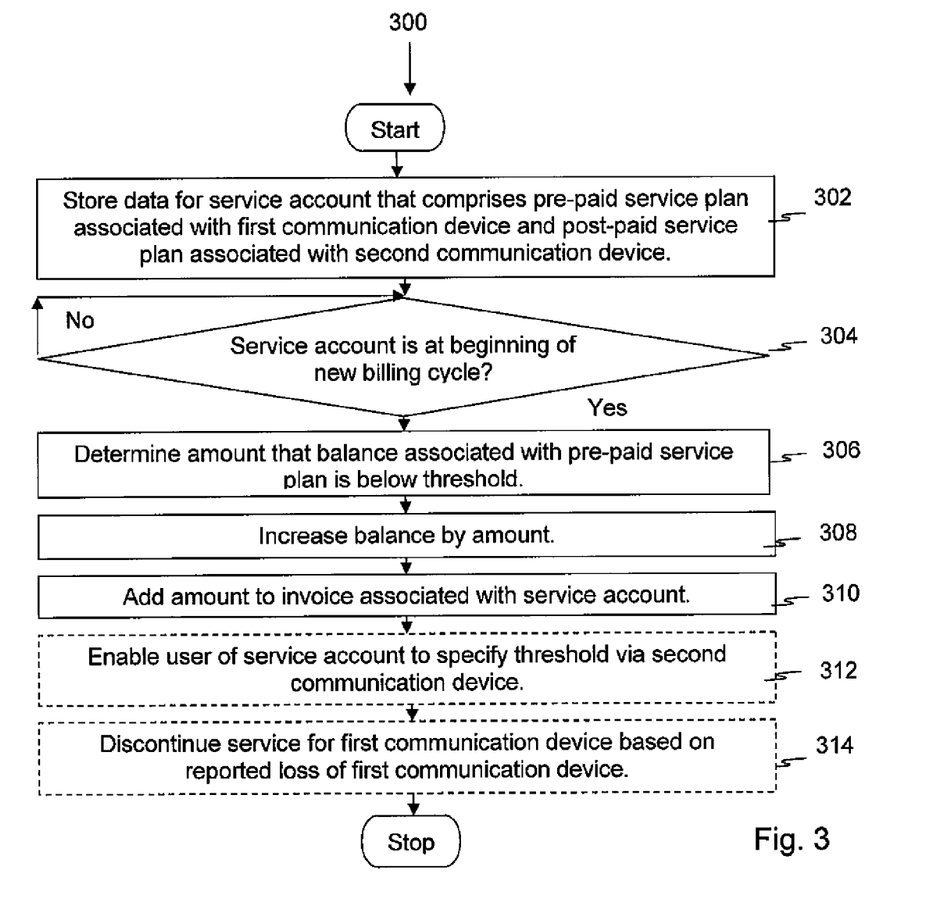
FIG. 3 is a flowchart of another method for a service plan manager according to some embodiments of the present disclosure.

FIG. 3 shows a flowchart of a method 300 for a service plan manager according to some embodiments of the present disclosure. The system 100 can execute the method 300 to automatically increase the balance on a pre-paid service plan to a predetermined level at the beginning of each billing cycle. The method 300 may apply to either family plans or to business plans.

In box 302, data is stored for a service account that comprises a pre-paid service plan associated with a first communication device and a post-paid service plan associated with a second communication device. For example, the manager engine 120 stores data for a parent's service account that includes a pre-paid service plan associated with the child communication device 104 and a post-paid service plan associated with the parent communication device 102.

In box 304, whether a service account is at beginning of a new billing cycle is determined. For example, the manager engine 120 determines whether the parent's service account is at beginning of a new billing cycle. If the manager engine 120 determines that the parent's service account is not at the beginning of the new billing cycle, the method 300 returns to box 304 to continue checking the for the beginning of the new billing cycle. If the manager engine 120 determines that the service account is at the beginning of the new billing cycle, the method 300 continues to box 306.

In box 306, an amount that a balance associated with the pre-paid service plan is below a threshold is determined. For example, the manager engine 120 determines that the $10 balance for the child's pre-paid service plan is $20 below a maximum monthly threshold of $30.

In box 308, the balance is increased by the amount. For example, the manager engine 120 increases the $10 balance by $20 to the $30 maximum monthly threshold.

In box 310, the amount is optionally added to an invoice associated with the service account. For example, the manager engine 120 adds $20 to an invoice associated with the parent's service account.

In box 312, a user of service account is optionally enabled to specify the threshold via the second communication device. For example, the manager engine 120 enables a parent to change the monthly maximum threshold from $30 to $35 via the parent communication device 102.

In box 314, service for the first communication device is optionally discontinued based on a reported loss of the first communication device. For example, the manager engine 120 discontinues service for the child communication device 104 in response to the parent reporting a loss of the child communication device 104 via the parent communication device 102.

Some aspects of the system described above may be implemented on a computer with sufficient processing power, memory resources, and network throughput capability to handle the necessary workload placed upon it. FIG. 4 illustrates a typical computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A service plan manager, comprising:
a storage device to store data for a service account that comprises a pre-paid service plan associated with a first communication device and a post-paid service plan associated with a second communication device;
a processor;
a manager engine, when executed by the processor, to determine whether a balance associated with the pre-paid service plan is below a threshold,
to communicate a request for increasing the balance to a device associated with the service account in response to a determination that the balance associated with the pre-paid service plan is below the threshold, wherein the request provides information about communications associated with the first communication device, and wherein the provided information comprises information about calls made and text messages sent by the first communication device, to discontinue service for the first communication device until an approval of the request for increasing the balance is received, wherein service restoration is not automatic, and wherein the approval of the request for increasing the balance for the first communication device is triggered at the start of a next billing cycle for the service account, to increase the balance in response to a receipt of the approval of the request for increasing the balance, and to add an amount associated with increasing the balance to an invoice associated with the service account.

2. The service plan manager of claim 1, wherein the second communication device is one of a land line telephone and a mobile telephone.

3. The service plan manager of claim 1, wherein the device associated with the service account is at least one of the second communication device and a user interface associated with the service account.

4. The service plan manager of claim 1, wherein the request is communicated as a text message.

5. The service plan manager of claim 1, wherein the amount added to the invoice is greater than an amount associated with increasing the balance.

6. The service plan manager of claim 1, wherein the manager engine communicates via a base transceiver station via a communication network to communicate with the first communication device via "over the air" messaging.

7. The service plan manager of claim 1, wherein the approval of the request for increasing the balance specifies the amount based on user input.

8. The service plan manager of claim 7, wherein the amount based on user input is displayed to the first communication device.

9. A non-transitory computer readable medium storing instructions that when executed by a processor perform a method for a service plan manager, the method comprising:

storing data for a service account that comprises a pre-paid service plan associated with a first communication device and a post-paid service plan associated with a second communication device;

determining whether a balance associated with the pre-paid service plan is below a threshold;

communicating a request for increasing the balance to a device associated with the service account in response to a determination that the balance associated with the pre-paid service plan is below the threshold, wherein the request provides information about communications associated with the first communication device, and wherein the provided information comprises information about calls made and text messages sent by the first communication device;

discontinuing service for the first communication device until an approval of the request for increasing the balance is received, wherein service restoration is not automatic, and wherein the approval of the request for increasing the balance for the first communication device is triggered at the start of a next billing cycle for the service account;

increasing the balance in response to a receipt of the approval of the request for increasing the balance; and adding an amount associated with increasing the balance to an invoice associated with the service account.

10. The method of claim 9, wherein increasing the balance comprises adding a specific number of minutes for user communication to the pre-paid plan.

11. The method of claim 9, further comprising adding another post-paid plan associated with a third communication device to the service account.

12. The method of claim 9, further comprising adding another pre-paid plan associated with a third communication device to the service account.

13. The method of claim 9, further comprising enabling a user of the service account to set at least one of the threshold and an amount for increasing the balance.

\* \* \* \* \*